United States Patent
Sakamoto et al.

(10) Patent No.: US 6,772,095 B2
(45) Date of Patent: Aug. 3, 2004

(54) METHOD AND SYSTEM FOR SERVICING AND MAINTAINING THERMAL EQUIPMENT, WATER TREATMENT EQUIPMENT AND THE LIKE

(75) Inventors: Tsuneo Sakamoto, Burlington (CA); Nobuyuki Ishizaki, Brantford (CA)

(73) Assignee: Miura Co., Ltd., Matsuyama (JP)

( * ) Notice: Subject to any disclaimer, the term of this patent is extended or adjusted under 35 U.S.C. 154(b) by 83 days.

(21) Appl. No.: 10/054,787

(22) Filed: Jan. 25, 2002

(65) Prior Publication Data

US 2002/0111706 A1 Aug. 15, 2002

(30) Foreign Application Priority Data

Jan. 25, 2001 (JP) ........................................ 2001-017366

(51) Int. Cl.[7] .......................... G06F 19/00; G06F 17/60; H04L 9/00
(52) U.S. Cl. ............................. 702/184; 705/7; 705/10; 705/52
(58) Field of Search ................................. 702/182, 183, 702/184; 700/292, 293, 294; 705/7, 8, 9, 11, 10, 52

(56) References Cited

U.S. PATENT DOCUMENTS 5,592,549 A * 1/1997 Nagel et al. ................... 705/52

OTHER PUBLICATIONS

US 2002/0007304A1, FieldDate: May 23, 2001, Foreign Application Priority Data: May 26, 2000 (JP) 2000–157200, "Method and system for offering customer information service to specific users utilizing communiction network", Kasajima et al.*

Spira et al. , "Method of providing maintenance services", Pub. No.: US 2002/0035495 A1, PubDate: Mar. 21, 2002, Non–provisional of provisional application No. 60/190,170, filed on Mar. 17, 2000.*

* cited by examiner

Primary Examiner—John Barlow
Assistant Examiner—John Le
(74) Attorney, Agent, or Firm—Birch, Stewart, Kolasch & Birch, LLP (57) ABSTRACT

A method and a system for servicing and maintaining thermal equipment, or water treatment equipment fulfills a prompt countermeasure against an abnormality. The servicing and maintenance system is provided with a communication line connecting between a facility site and a management center. The management center is provided with a database for storing various information on the thermal equipment and/or water treatment equipment, and a control unit for reading requested information from the database in response to a request of the facility site side to provide various information and transmitting the requested information to the facility site through the communication line. Further the facility site is provided with an information retrieval unit to request the control unit to provide various information through the communication line, receiving the requested information transmitted from the control unit, and confirming contents thereof.

11 Claims, 7 Drawing Sheets

METHOD AND SYSTEM FOR SERVICING AND MAINTAINING THERMAL EQUIPMENT, WATER TREATMENT EQUIPMENT AND THE LIKE

BACKGROUND OF THE INVENTION

The present invention relates to a method for servicing and maintaining thermal equipment, water treatment equipment and the like, which is employed between a facility site that concludes a servicing and maintenance contract regarding the thermal equipment, water treatment equipment and the like, and a management center, as well as to a system for servicing and maintaining thermal equipment, water treatment equipment and the like, which is established between a facility site that concludes a servicing and maintenance contract regarding the thermal equipment, water treatment equipment and the like, and a management center.

In recent years, with development of electronic technique and communication technique, automatic control of thermal equipment, for example, is provided with microcomputers and modems, and executed by a servicing and maintenance system using communication lines. More particularly, the thermal equipment installed in a facility site is equipped with various sensors that detect operating states of the thermal equipment, as well as with a thermal equipment controller that selects operating conditions of the thermal equipment based on signals from these various sensors. A control unit of a remote management center and the heat supply equipment controller of the heat supply equipment are connected to a communication line through a modem that can perform automatic transmittance and reception of data. This enables the thermal equipment to report the operating states thereof to the management center in real time, and enables the management center to perform servicing and maintenance of the thermal equipment based on the reported operating states.

The thermal equipment is serviced and maintained by the above-stated servicing and maintenance system. Accordingly, if an abnormal halt of the thermal equipment occurs, the abnormal halt is reported to the control unit of the remote management center through a communication line. In the management center, upon reception of the report on the abnormal halt of the thermal equipment, a data analyst collects information on the reported abnormal halt through use of the control unit, analyzes the cause thereof, and dispatches a maintenance man to the facility site for performing maintenance service such as repair works.

However, there has been a problem that when the maintenance man is on the way to the site or checking for the cause of the abnormality, the thermal equipment is left halted, and the halt period if elongated would incur a lot of loss to the facility site (Larger distance between the facility site and the management center causes later arrival of the maintenance man and longer halt period of the thermal equipment, thereby incurring larger loss).

Further, in the above servicing and maintenance system, there bas been a need of making a telephone call to the management center and talking with a person in charge of the management center for handling of the thermal equipment, inquiry, confirmation, and getting information on the price and delivery date of expendables and the like.

Accordingly, the present invention is to be made with consideration of the above-described circumstances, and an object thereof is to provide a method and a system for servicing and maintaining thermal equipment, water treatment equipment and the like, which fulfills a prompt countermeasure against an abnormality and eliminates a tiresome procedure of getting information.

In order to accomplish the above object, according to a first aspect of the present invention, a method for servicing and maintaining thermal equipment, water treatment equipment and the like, performed between one or more facility sites that have thermal equipment and/or water treatment equipment and conclude a servicing and maintenance contract regarding the thermal equipment and/or water treatment equipment, and a management center that performs servicing and maintenance of the thermal equipment and/or water treatment equipment in the corresponding facility site and has a database for storing various information on the thermal equipment and/or water treatment equipment, through use of a communication line, comprises the steps of: reading requested information when a request to provide each of the various information is transmitted from an information retrieval unit installed in the facility site to a control unit installed in the management center through the communication line; and transmitting the requested information read from the database to the information retrieval unit through the communication line.

In order to accomplish the above object, according to a second aspect of the present invention, a system for servicing and maintaining thermal equipment, water treatment equipment and the like, established between one or more facility sites that have thermal equipment and/or water treatment equipment and that conclude a servicing and maintenance contract regarding the thermal equipment and/or water treatment equipment, and a management center that performs servicing and maintenance of the thermal equipment and/or water treatment equipment in the corresponding facility site, comprises a communication line for connecting the facility site and the management center, the management center having a database for storing various information on the thermal equipment and/or water treatment equipment and a control unit for reading requested information from the database in response to a request of the facility site to provide the various information on the thermal equipment and/or water treatment equipment and transmitting the requested information read from the database to the facility site through the communication line, the facility site having an information retrieval unit that is capable of requesting the control unit to provide the various information through the communication line, receiving the requested information transmitted from the control unit through the communication line, and confirming contents thereof.

According to a third aspect of the present invention, in the system for servicing and maintaining thermal equipment, water treatment equipment and the like as defined in the second aspect, the information retrieval unit is disposed in the thermal device and/or water treatment device, or in the vicinity thereof.

According to the first aspect of the present invention, when the information retrieval unit installed in the facility site requests the control unit installed in the management center to provide various information through the communication line, there is carried out a step for reading requested information from the database. Next, there is carried out a step for transmitting the requested information read from the database to the information retrieval unit through the communication line. Thus, the facility site can get requested information. If, for example, the requested information is about Q&A or troubleshooting regarding an abnormality occurred in the thermal equipment and/or water treatment equipment, maintenance work can be done in some degree till a maintenance man arrives at the facility site. In some cases, dispatch of a maintenance man may become unnecessary. This enables the facility site to shorten a halt period and enables the management center to reduce frequency of dispatching a maintenance man. If the requested information is about setting values or management values of the thermal equipment and/or water treatment equipment, they may be utilized in a periodic inspection or in occurrence of an abnormality, and they save the facility site storing and managing past data on trial operation and every periodic inspection. If the requested information is about components of the thermal equipment and/or water treatment equipment, there may be obtained information on a lifetime of the component, delivery date or price when ordered and component specifications. Further, if the requested information is about handling of the thermal equipment and/or water treatment equipment, there may be obtained information on handling, setting, cleaning and maintenance of each component. The stated above is described on condition that a servicing and maintenance contract should be concluded. It is noted that information is obtainable without a tiresome procedure of making contact with a person in charge of the management center by telephone.

According to the second aspect of the present invention, the servicing and maintenance system is established between a facility site that has thermal equipment and/or water treatment equipment, and a management center that performs servicing and maintenance of the thermal equipment and/or water treatment equipment, based on a servicing and maintenance contract regarding the thermal equipment and/or water treatment equipment concluded between the facility site and the management center. The management center is provided with a database and a control unit, while the facility site is provided with an information retrieval unit. Between the facility site and the management center, there is provided a communication line. The database stores various information on the thermal equipment and/or water treatment equipment, whereas the control unit reads requested information from the database in response to a request of the facility site to provide the various information on the thermal equipment and/or water treatment equipment and transmits the requested information read from the database to the facility site through the communication line. The information retrieval unit requests the control unit to provide the various information through the communication line, and receives the requested information transmitted from the control unit through the communication line. This enables the facility site to confirm contents of the received information. It is noted that information is obtainable without a tiresome procedure. In confirming the contents of the received information, if, for example, the requested information is about Q&A or troubleshooting regarding an abnormality occurred in the thermal equipment and/or water treatment equipment, maintenance work can be done in some degree till a maintenance man arrives at the facility site. In some cases, dispatch of a maintenance man may become unnecessary. This enables the facility site to shorten a halt period and enables the management center to reduce frequency of dispatching a maintenance man. If the requested information is about setting values or management values of the thermal equipment and/or water treatment equipment, they may be utilized in a periodic inspection or in occurrence of an abnormality, and they save the facility site storing and managing past data on trial operation and every periodic inspection. If the requested information is about components of the thermal equipment and/or water treatment equipment, there may be obtained information on a lifetime of the component, delivery date or price when ordered and component specifications. Further, if the requested information is about handling of the thermal equipment and/or water treatment equipment, there may be obtained information on handling, setting, cleaning and maintenance of each component.

DETAILED DESCRIPTION OF THE PREFERRED EMBODIMENTS

The following description discusses the embodiments of the present invention with reference to the accompanying drawings.

Figure 2:
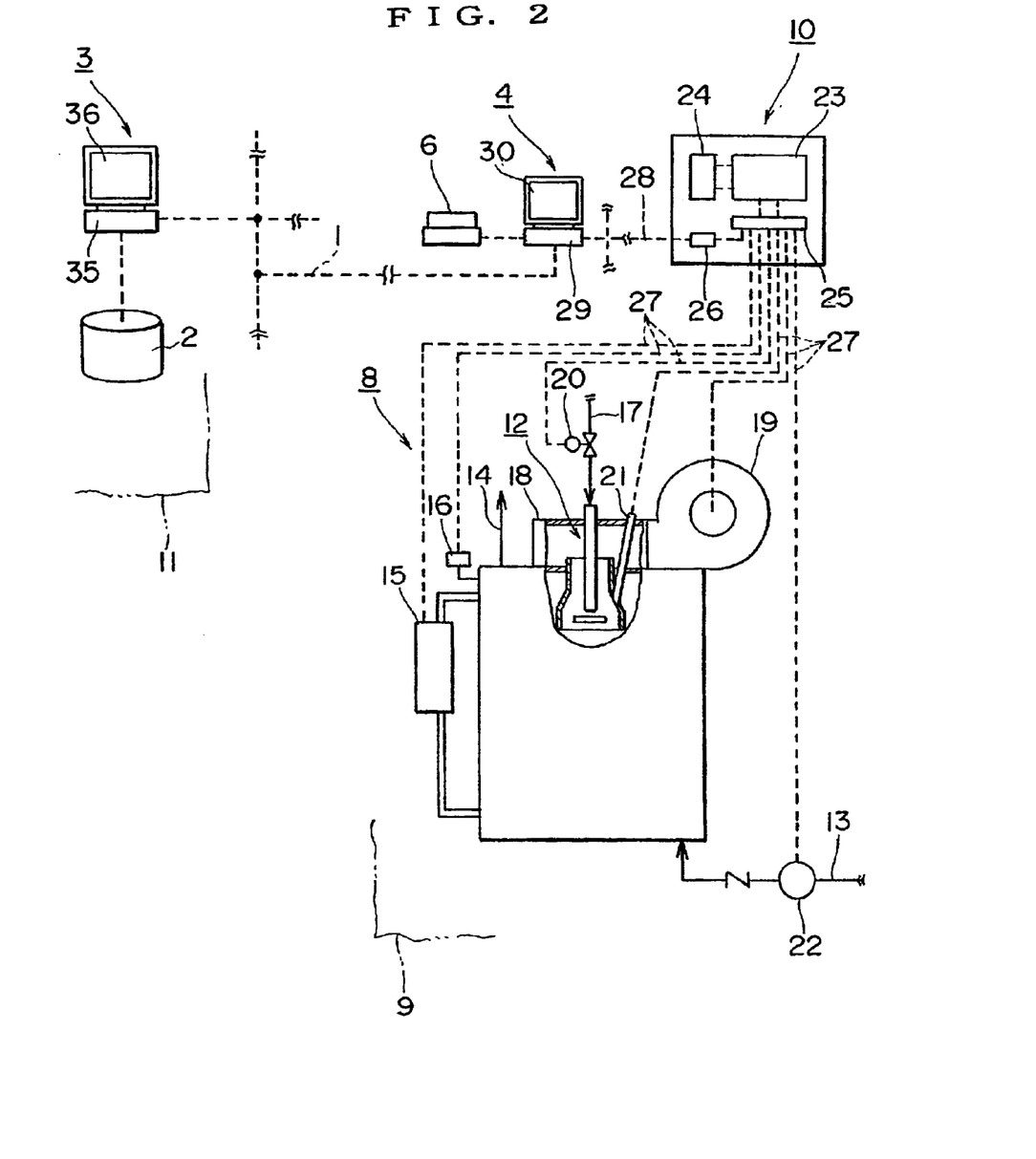
FIG. 2 is a configuration diagram of the system for servicing and maintaining thermal equipment, water treatment equipment and the like according to one embodiment of the present invention.
Figure 3:
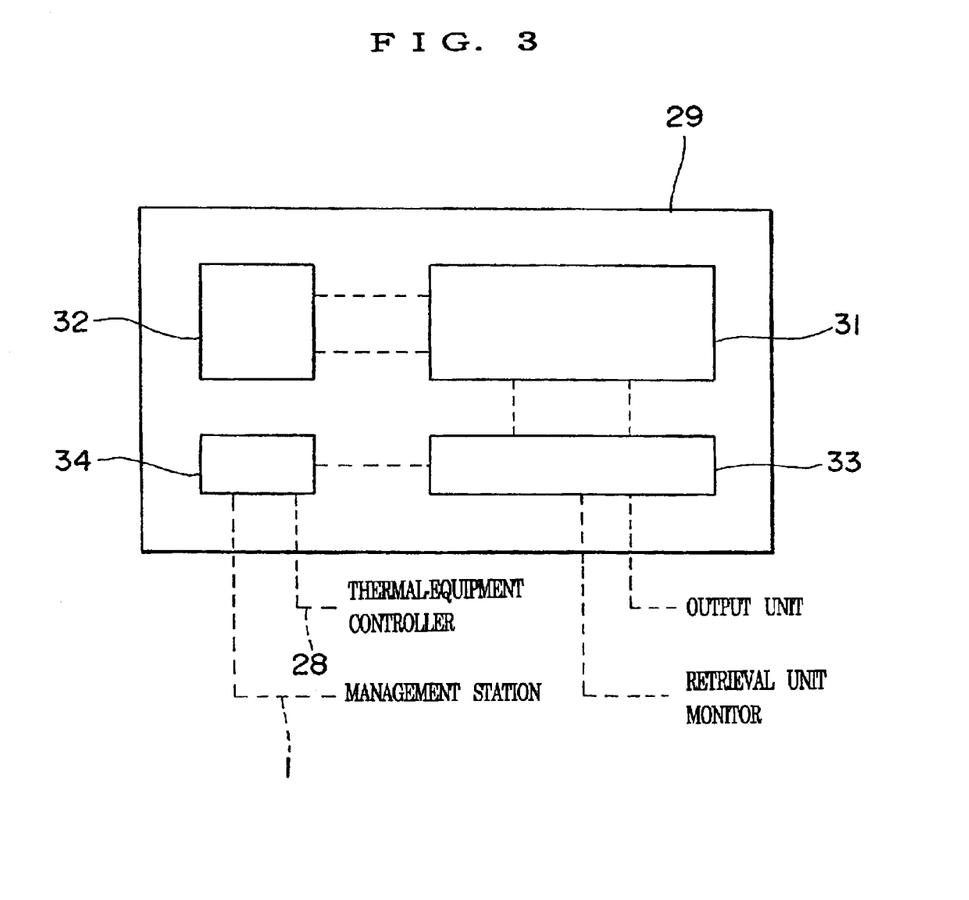
FIG. 3 is a block diagram showing the configuration of an information retrieval unit.
Figure 4:
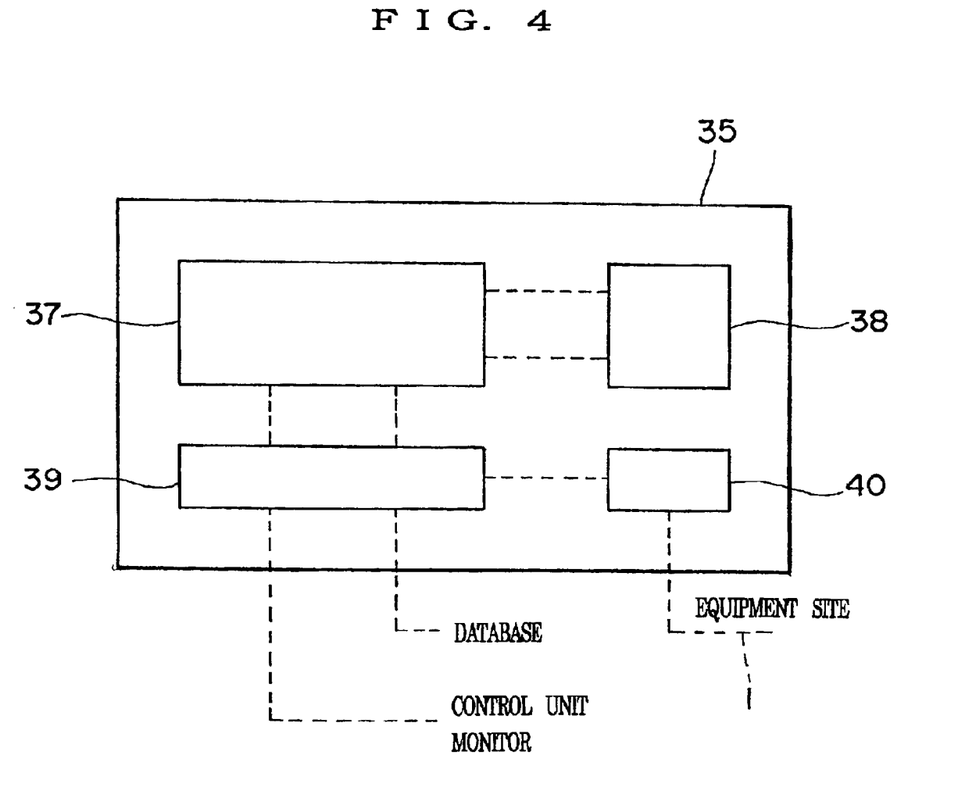
FIG. 4 is a block diagram showing the configuration of a control unit.
Figure 5:
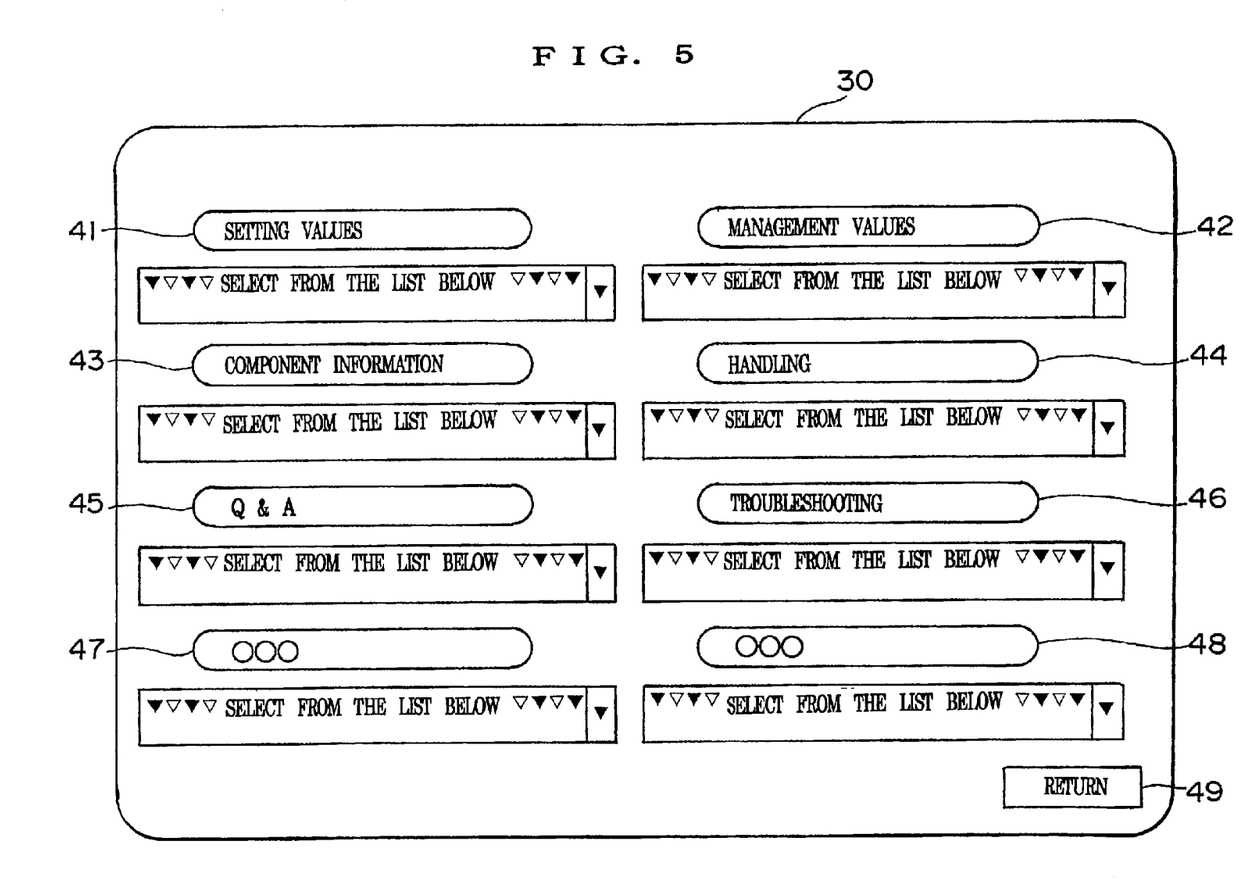
FIG. 5 is a schematic view showing one example of the items displayed in performing information retrieval.
Figure 6:
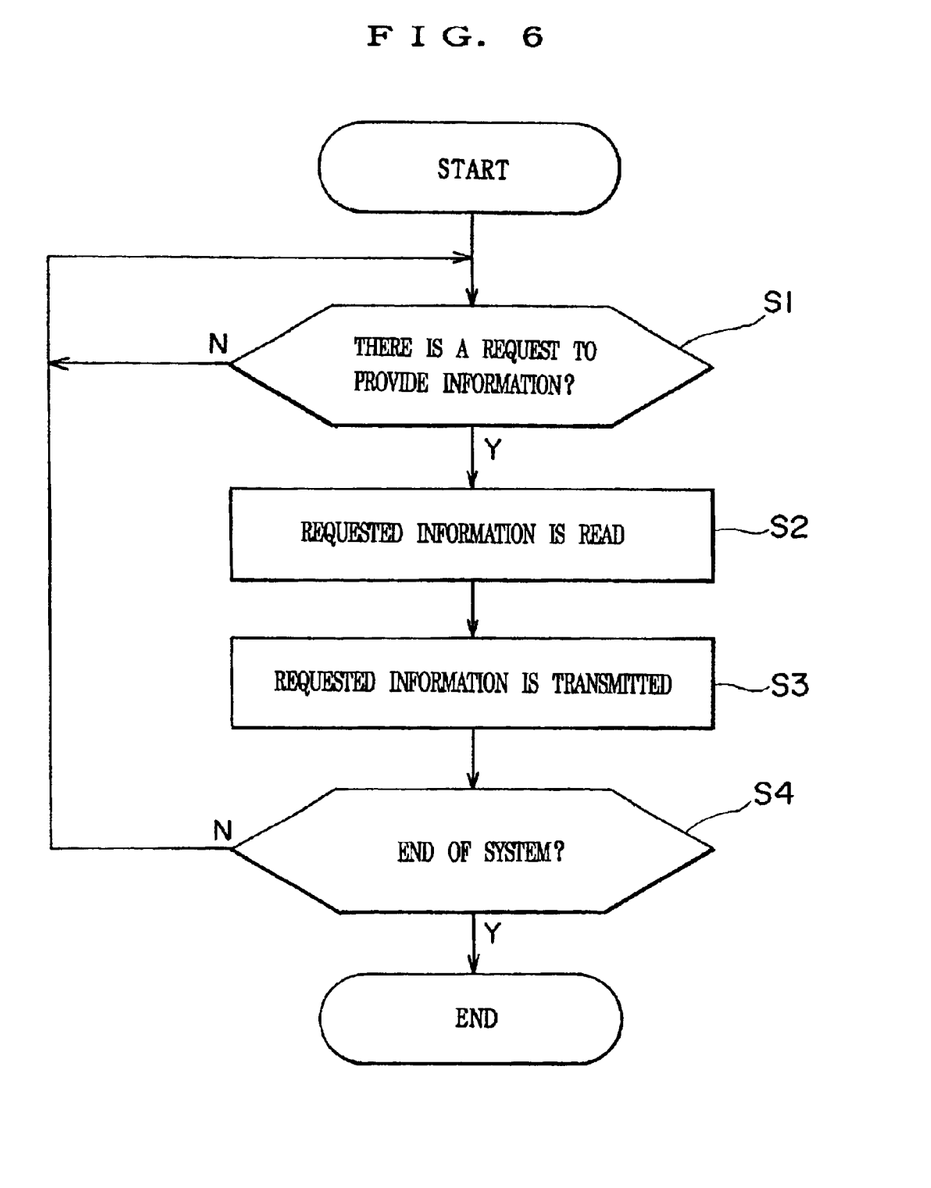
FIG. 6 is a flowchart showing operation of the control unit.
Figure 7:
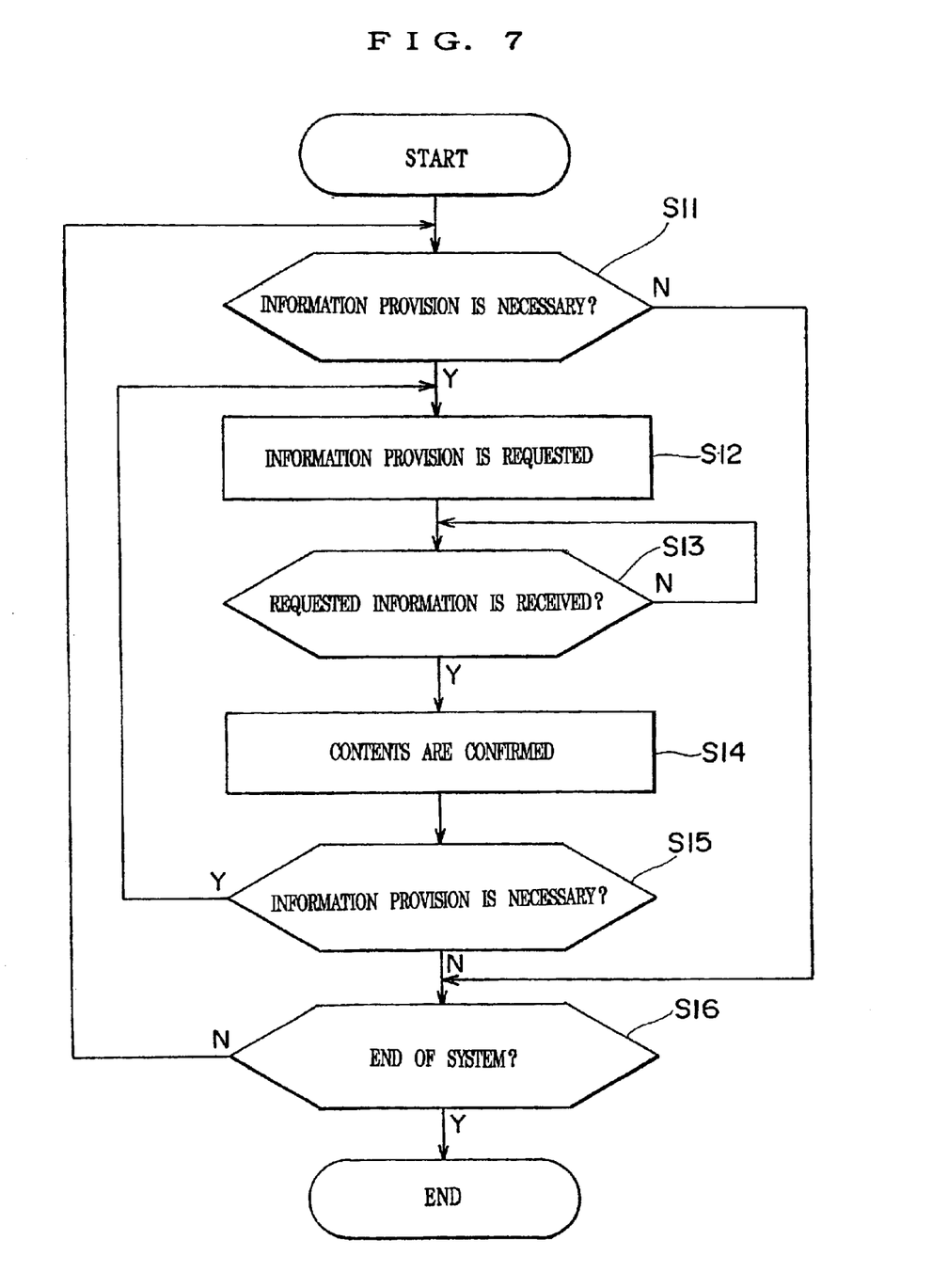
FIG. 7 is a flowchart showing operation of the information retrieval unit.

FIG. 2 is a configuration diagram of a system for servicing and maintaining thermal equipment, water treatment equipment and the like according to one embodiment of the present invention, FIG. 3 is a block diagram showing the configuration of an information retrieval unit, FIG. 4 is a block diagram showing the configuration of a control unit, FIG. 5 is a schematic view showing one example of the items displayed in performing information retrieval, FIG. 6 is a flowchart showing operation of the control unit, and FIG. 7 is a flowchart showing operation of the information retrieval unit.

Figure 1:
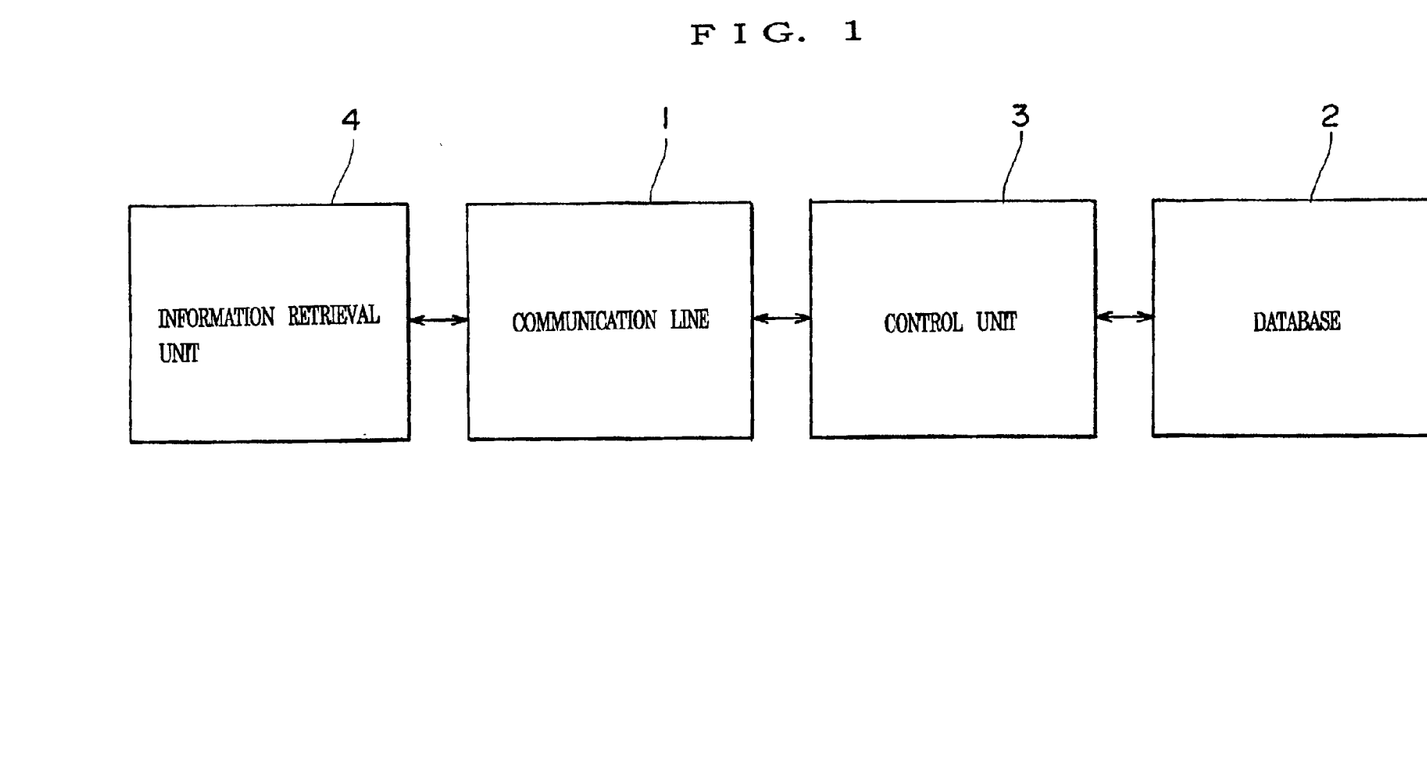
FIG. 1 is a view showing the basic configuration of a system for servicing and maintaining thermal equipment, water treatment equipment and the like in the present invention.

FIG. 1 shows the basic configuration of a system for servicing and maintaining thermal equipment, water treatment equipment and the like in the present invention. The system includes information retrieval unit 4, communication line 1, control unit 3, and database 2. Each is disclosed in greater detail below.

In FIG. 2, reference numeral 8 denotes a boiler as thermal equipment installed in a facility site 9 (or denotes water treatment equipment, or thermal equipment and water treatment equipment). In the facility site 9 provided with the boiler 8, there are provided a thermal-equipment controller 10, an information retrieval unit 4 and an output unit 6 in addition to the boiler 8. The facility site 9 is connected to a management center 11 through a communication line 1, and the management center 11 is provided with a control unit 3 and a database 2.

It is noted that the facility site 9 is concluded a specified contract regarding the boiler 8 (e.g., a contract regarding servicing and maintenance of the boiler 8) with the management center 11. It is also noted that the communication line 1 and a later-described communication line 28 may be wired (public line or exclusive line) or wireless. Further, it is understood that the management center 11 is connected to one or a plurality of facility sites 9 through the communication line 1.

First, the configuration of each equipment will be described in detail.

The boiler 8 is composed of a burner 12, a feed water line 13, a steam line 14, a water-level detecting means 15 and a steam pressure detection means 16. To the burner 12, a fuel feed line 17 is connected. The burner 12 is equipped with a blower 19 via a window box 18. The fuel feed line 17 is equipped with a fuel valve 20, and the window box 18 is equipped with a flame detecting means 21 for detecting the state of flames, i.e. the state of combustion, of the burner 12.

The feed water line 13 is provided with a feed water pump 22, which is connected to the lower side of the boiler 8, whereas the steam line 14 is connected to the upper side of the boiler 8. The water-level detecting means 15 is configured so as to detect a water level in the boiler body, whereas the steam-pressure detecting means 16 is configured so as to detect steam pressure in the boiler body.

The thermal-equipment controller 10 is a device (having the function of so-called microcomputer) for automatic control of the boiler 8, and is provided in the boiler 8. The thermal-equipment controller 10 is composed of a controller operating section 23, a controller storage section 24, a controller interface 25 and a controller modem 26. The thermal-equipment controller 10 is controlled by the information retrieval unit 4. When an abnormality is occurred in the boiler 8, a signal or the like to report the abnormality is sent to the information retrieval unit 4, and the information retrieval unit 4 reports occurrence of the abnormality to the management center 11. In the case of only one boiler 8 provided, the thermal-equipment controller 10 may be functioned as an information retrieval unit 4.

The controller operating section 23 has the function of a CPU (Central Processing Unit) in a microcomputer, and operates in accordance with a control program prestored in the controller storage section 24. The controller operating section 23 is connected to the controller storage section 24 and the controller interface 25 are connected.

The controller storage section 24 has the functions of a ROM (Read Only Memory), a RAM (Random Access Memory) and an EEPROM (Electrically Erasable and Programmable Read Only Memory) in a microcomputer, and stores a control program, fixed data, setting value information and the like. The controller storage section 24 also has such area as a data area for storing various data for use in processing by the controller operating section 23, and a work area for use in the above processing.

The controller interface 25 is connected to the controller modem 26. The controller interface 25 is also connected through a plurality of lines 27 to the water-level detecting means 15, the steam-pressure detecting means 16, the blower 19, the fuel valve 20, the flame detecting means 21 and the feed water pump 22. The operating state of the boiler 8 is sequentially sent to the controller operating section 23 through the controller interface 25.

The controller modem 26 is connected to the information retrieval unit 4 through the communication line 28. In this embodiment, a known modem is used as the controller modem 26.

The information retrieval unit 4 is configured so as to control and monitor one or a plurality of boilers 8, as well as to collect information regarding the operating state of the one or a plurality of the boilers 8. The information retrieval unit 4 is also used for retrieval of various information stored in the database 2 of the management center 11, and is capable of requesting the management center 11 to provide necessary information. The information retrieval unit 4 is composed of a retrieval unit main body 29, a retrieval unit monitor 30 (a display unit operated by a person in charge of equipment or a boiler operator in the facility site 9 to confirm the operating state of the boiler 8, retrieve the above information and to confirm contents thereof), and an unshown input unit (a keyboard, a mouse, etc.). The information retrieval unit 4 is connected to the output unit 6. It is understood that the information retrieval unit 4 may be composed of, for example, a personal portable computer.

The retrieval unit main body 29 is, as shown in FIG. 3 (and FIG. 2), composed of a retrieval unit operating section 31, a retrieval unit storage section 32, a retrieval unit interface 33 and a retrieval unit modem 34. The retrieval unit operating section 31 is connected to the retrieval unit storage section 32 and the retrieval unit interface 33, and the retrieval unit interface 33 is connected to the output unit 6, the retrieval unit monitor 30 and the retrieval unit modem 34. Further, the retrieval unit modem 34 is connected to the communication lines 1 and 28. The information retrieval unit 4 is connected to the management center 11 and the thermal-equipment controller 10 through the communication lines 1 and 28, respectively. It is noted that a known modem is used as the retrieval unit modem 34 in the present embodiment. It is also noted that the retrieval unit main body 29 has the function of transmitting and receiving e-mails.

The retrieval unit operating section 31, similar to the controller operating section 23 of the thermal-equipment controller 10, has the function of a CPU in a microcomputer. The retrieval unit operating section 31 operates in accordance with a control program prestored in the retrieval unit storage section 32.

The retrieval unit storage section 32, similar to the controller storage section 24 of the thermal-equipment controller 10, has the functions of a ROM, a RAM and an EEPROM in a microcomputer. The retrieval unit storage section 32 stores a control program, fixed data, setting value information and the like. Further, the retrieval unit operating section 31 has such area as a data area for storing various data (e.g., information data collected regarding the operating state of the boiler 8) for use in processing by the retrieval unit operating section 31, and a work area for use in the above processing.

With reference back to FIG. 2, the output unit 6 is exemplified by a printer. The output unit 6 is capable of printing requested information or e-mails that are provided by the management center 11 and received by the information retrieval unit 4.

The control unit 3 is configured so as to control and monitor one or a plurality of information retrieval units 4 (to control and monitor the boiler 8 by taking in information on the above-stated operating state). The control unit 3 is a device capable of reading information requested by the facility site 9 from the database 2 and transmitting the read information (requested information) to the facility site 9 through the communication line 1. The control unit 3 is composed of a control unit main body 35, and a control unit monitor 36 (a display unit operated by a person in charge of the management center 11 to confirm the operating state of the boiler 8 or contents of requested information). It is understood that the control unit 3 may be composed of, for example, a personal portable computer.

As shown in FIG. 4 (and FIG. 2), the control unit main body 35 is composed of a control unit operating section 37, a control unit storage section 38, a control unit interface 39 and a control unit modem 40. The control unit operating section 37 is connected to the control unit storage section 38 and the control unit interface 39, and the control unit interface 39 is connected to the database 2, the control unit monitor 36 and the control unit modem 40 (as well as to an unshown device such as keyboards). Further, the control unit modem 40 is connected to the communication line 1. It is noted that a known modem is used as the control unit modem 40 in the present embodiment. It is also noted that the control unit main body 35 has the function of transmitting and receiving e-mails.

The control unit operating section 37, similar to the retrieval unit operating section 31 of the information retrieval unit 4, has the function of a CPU in a microcomputer. The control unit operating section 37 operates in accordance with a control program prestored in the control unit storage section 38.

The control unit storage section 38, similar to the retrieval unit storage section 32 of the information retrieval unit 4, has the functions of a ROM, a RAM and an EEPROM in a microcomputer. The control unit storage section 38 stores a control program, fixed data, setting value information and the like. Further, the control unit storage section 38 has such area as a data area for storing various data for use in processing by the control unit operating section 37, and a work area for use in the above processing.

In the database 2, there are readable information properly stored by the control unit operating section 37. The information stored includes at least various information on the boiler 8. It is noted that the various information on the boiler 8 includes setting values, management values, component information, handling, Q&A and troubleshooting. It is also noted that the control unit storage section 38 may substitute for the database 2.

In the present embodiment, retrieval of various information stored in the database 2 is performed by displaying the input area of various items as shown for example in FIG. 5 on the retrieval unit monitor 30 in the facility site 9 (although not limited thereto). More particularly, for performing information retrieval, there are displayed on the retrieval unit monitor 30, a setting value input area 41, a management value input area 42, a component information input area 43, a handling input area 44, a Q&A input area 45, a troubleshooting input area 46, other items input areas 47 and 48 (shown with ○○○ in the drawing), and a return input area 49 for returning to the screen displaying the operating state. It is noted that the above stated items are operated by an unshown mouse (or may be operated by a finger or a pen touch).

Next, description will be given of the outlined operation performed by the control unit operating section 37 in the control unit 3 with reference to FIG. 6. It is noted that FIG. 2 is also referred where necessary. The following description of the outlined operation (outlined operation with reference to FIGS. 6 and 7) will be made as description of the servicing and maintenance method of the present invention.

At step S1, it is determined if there is a request from the information retrieval unit 4 to provide the various information through the communication line 1. If there is no request to provide information (N at step S1), the processing is in standby till a request is made. If there is a request (Y at step S1), the processing shifts to step S2.

Upon shift of the processing to step S2, requested information is read from the various information stored in the database 2, and the processing shifts to step S3.

Upon shift of the processing to step S3, requested information read from the database 2 is transmitted to the information retrieval unit 4 through the communication line 1, and the processing shifts to step S4.

Upon shift of the processing to the step S4, a series of processing end if the system stops and ends (Y at step S4), and if not (N at step S4), the processing returns to the step S1, where it is determined if there is a request to provide information.

Next, description will be given of the outlined operation performed by the retrieval unit operating section 31 in the information retrieval unit 4 with reference to FIG. 7. It is noted that FIG. 2 is also referred where necessary.

At step S11, it is determined if provision of the various information is necessary. If information provision is not necessary (N at step S11), the processing shifts to step S16. If information provision is necessary (Y at step S11: the input area of various items as shown in FIG. 5 is displayed on the retrieval unit monitor 30), the processing shifts to step S12.

Upon shift of the processing to the step S12, necessary information is retrieved and selected, after which a request to provide information is transmitted to the control unit 3, and the processing shifts to step S13.

Upon shift of the processing to the step S13, it is determined if requested information from the control unit 3 is received or not. If the requested information is not received (N at step S13), the processing is in standby till the information is received. If the requested information is received (Y at step S13), the processing shifts to step S14.

Upon shift of the processing to the step S14, contents of the requested information is confirmed. After confirmation is completed, the processing shifts to step S15.

Upon shift of the processing to the step S15, it is again determined if provision of the various information is necessary. If information provision is not necessary (N at step S15), the processing shifts to step S16. If information provision is necessary again (Y at step S15: the input area of various items as shown in FIG. 5 is again displayed on the retrieval unit monitor 30), the processing shifts to the step S12.

Upon shift of the processing to the step S16, a series of processing end if the system stops and ends (Y at step S16). If not (N at step S16), the processing returns to the step S11 again, where it is determined if there is a request to provide information.

The above description will be summarized as below. First, when the information retrieval unit 4 installed in the facility site 9 requests to provide various information to the control unit 3 installed in the management center 11 through the communication line 1, there is executed a step for reading the requested information from the database 2. Next, there is executed a step for transmitting the requested information read from the database 2 to the information retrieval unit 4 through the communication line 1. This enables the facility site 9 to obtain requested information.

If, for example, the requested information is about Q&A or troubleshooting regarding an abnormality occurred in the boiler 8, maintenance work can be done in some degree till a maintenance man arrives at the facility site 9. In some cases, dispatch of a maintenance man may become unnecessary. This enables the facility site 9 to shorten a halt period and enables the management center 11 to reduce frequency of dispatching a maintenance man. It goes without saying that installing the information retrieval unit 4 in the boiler 8 or in the vicinity thereof implements prompt recovery from an abnormality of the boiler 8.

If the requested information is about setting values or management values of the boiler 8, they may be utilized in a periodic inspection or in occurrence of an abnormality, and they save the facility site 9 storing and managing past data on trial operation and every periodic inspection.

If the requested information is about components of the boiler 8, there may be obtained information on a lifetime of the component, delivery date or price when ordered and component specifications.

Further, if the requested information is about handling of the boiler 8, there may be obtained information on handling, setting, cleaning and maintenance of each component.

The stated above is described on condition that a servicing and maintenance contract should be concluded. It is noted that information is obtainable without a tiresome procedure. It should be understood that the present invention is capable of numerous modifications without departing from the spirit of the invention.

As is clear from the above description, according to the first aspect of the present invention, prompt action against occurrence of an abnormality can be implemented. In addition, various information on the thermal equipment and/or water treatment equipment is obtainable without a tiresome procedure. Therefore, it is possible to provide the method for servicing and maintaining the thermal equipment, water treatment equipment and the like, which fulfills a prompt countermeasure against an abnormality and eliminates a tiresome procedure of getting information.

According to the second aspect of the present invention, prompt action against occurrence of an abnormality can be implemented. In addition, various information on the thermal equipment and/or water treatment equipment is obtainable without a tiresome procedure. Therefore, it is possible to provide the system for servicing and maintaining the thermal equipment, water treatment equipment and the like, which fulfills a prompt countermeasure against an abnormality and eliminates a tiresome procedure of getting information.

According to the third aspect of the present invention, swifter recovery from an abnormality is implemented.

What is claimed is:

1. A method for servicing and maintaining thermal equipment, water treatment equipment and the like, performed between at least one facility site that has equipment and conclude a servicing and maintenance contract regarding the equipment, and a management center that performs servicing and maintenance of the equipment in a corresponding facility site and has a database for storing various information on the equipment, through use of a communication line, comprising the steps of:

monitoring the equipment with an information retrieval unit installed in the facility site for collecting operating state information regarding the equipment;

reading requested information for the equipment when a request to provide each of the various information for the equipment is transmitted from the information retrieval unit installed in the facility site to a control unit installed in the management center through the communication line; and transmitting the requested information read from the database to the information retrieval unit through the communication line.

2. The method for servicing and maintaining thermal equipment, water treatment equipment and the like, as claimed in claim 1, wherein the equipment comprises thermal equipment.

3. The method for servicing and maintaining thermal equipment, water treatment equipment and the like, as claimed in claim 1, wherein the equipment comprises water treatment equipment.

4. The method for servicing and maintaining thermal equipment, water treatment equipment and the like, as claimed in claim 1, further comprising outputting the requested information at the facility site.

5. The method for servicing and maintaining thermal equipment, water treatment equipment and the like, as claimed in claim 1, further comprising determining the various information is to be requested for the equipment in response to the collected operating state information.

6. A system for servicing and maintaining thermal equipment, water treatment equipment and the like, established between at least one facility site that has equipment and that conclude a servicing and maintenance contract regarding the equipment, and a management center that performs servicing and maintenance of the equipment in the corresponding facility site, comprising a communication line for connecting the facility site and the management center, the management center having a database for storing various information on the equipment and a control unit for reading requested information from the database in response to a request of the facility site to provide the various information on the equipment, and transmitting the requested information read from the database to the facility site through the communication line, the facility site having an information retrieval unit that monitors the equipment to collect operating state information regarding the equipment, requests the control unit to provide the various information through the communication line, receives the requested information transmitted from the control unit through the communication line, and confirms contents thereof.

7. The system for servicing and maintaining thermal equipment, water treatment equipment and the like as defined in claim 6, wherein the information retrieval unit is disposed in the equipment, or in the vicinity thereof.

8. The system for servicing and maintaining thermal equipment, water treatment equipment and the like, as claimed in claim 6, wherein the equipment comprises thermal equipment.

9. The system for servicing and maintaining thermal equipment, water treatment equipment and the like, as claimed in claim 6, wherein the equipment comprises water treatment equipment.

10. A method for servicing and maintaining equipment at a facility site, wherein the facility site is linked to a management center to perform service and maintenance to the facility site, comprising the steps of:

monitoring the equipment at the facility site to control an operating state with an information retrieval unit at the facility site;

detecting an abnormality in the operating state of the equipment;

transmitting a request for information from the information retrieval unit to a control unit located at the management center in response to the abnormality;

receiving various information read from a database coupled to the control unit pertaining to the equipment at the information retrieval unit; and providing the various information for service and maintenance at the facility site.

11. The method servicing and maintaining equipment at a facility site, as claimed in claim 10, wherein the detecting includes receiving a signal at the information retrieval unit regarding the abnormality.

* * * * *